US007558235B2

(12) United States Patent
Lester et al.

(10) Patent No.: US 7,558,235 B2
(45) Date of Patent: Jul. 7, 2009

(54) METHOD FOR EFFICIENT BANDWIDTH UTILIZATION IN A WIRELESS RADIO NETWORK

(75) Inventors: Joseph O. Lester, Chandler, AZ (US);
Apoorv Chaudhri, Sunrise, FL (US);
Leslie G. Gustafson, Oakwood Hills, IL (US); Stanko Jelavic, Davis, FL (US)

(73) Assignee: Motorola, Inc., Schaumburg, IL (US)

( * ) Notice: Subject to any disclaimer, the term of this patent is extended or adjusted under 35 U.S.C. 154(b) by 817 days.

(21) Appl. No.: 10/704,296

(22) Filed: Nov. 7, 2003

(65) Prior Publication Data

US 2005/0099987 A1      May 12, 2005

(51) Int. Cl.
*H04Q 7/00* (2006.01)
*H04Q 7/28* (2006.01)
*H04Q 7/20* (2006.01)
*H04J 3/16* (2006.01)

(52) U.S. Cl. .................. 370/329; 370/341; 370/437; 455/450

(58) Field of Classification Search . 370/395.2–395.31, 370/329, 437; 455/446–455
See application file for complete search history.

(56) References Cited

U.S. PATENT DOCUMENTS

| 5,465,391 | A | * | 11/1995 | Toyryla | 455/518 |
| 5,542,093 | A | * | 7/1996 | Bodin et al. | 370/335 |
| 6,021,123 | A | * | 2/2000 | Mimura | 370/331 |
| 6,128,500 | A | * | 10/2000 | Raghavan et al. | 455/453 |
| 6,522,885 | B1 | * | 2/2003 | Tang et al. | 455/447 |
| 7,177,649 | B1 | * | 2/2007 | Nielsen | 455/453 |
| 2002/0098860 | A1 | * | 7/2002 | Pecen et al. | 455/522 |
| 2004/0090929 | A1 | * | 5/2004 | Laux et al. | 370/311 |

* cited by examiner

*Primary Examiner*—Tri H Phan
(74) *Attorney, Agent, or Firm*—Terri S. Hughes; Valerie M. Davis

(57) ABSTRACT

In a network comprising a plurality of channels, at least two channels are operating at different frequencies. The fixed network equipment (FNE; 124, 126) identifies a plurality of channels present at a serving site and classifies each channel into one of a plurality of bandwidth groups. All the channels in a given bandwidth group have common roaming characteristics. The FNE periodically broadcasts information relating to at least one channel in each bandwidth group present at the serving site. The FNE further identifies least one channel present at an adjacent site. Each channel present at the adjacent site is also classified in one of the plurality of bandwidth groups. The FNE broadcasts information on loading for each bandwidth group present at the adjacent site.

16 Claims, 1 Drawing Sheet

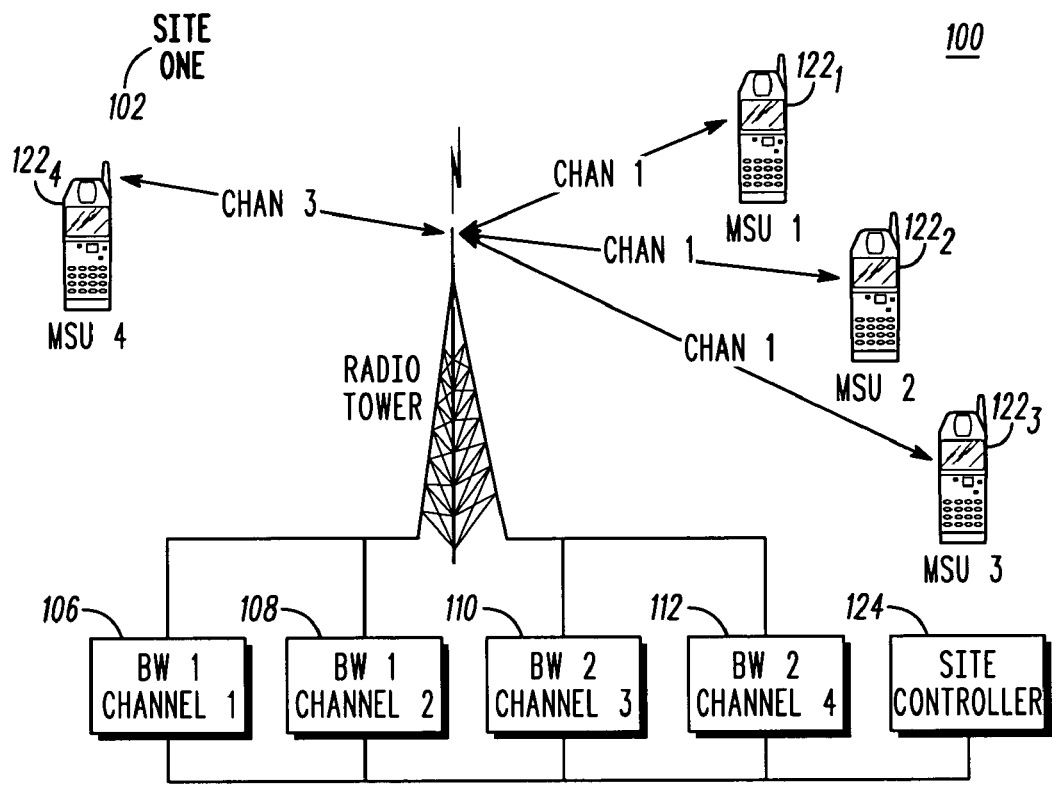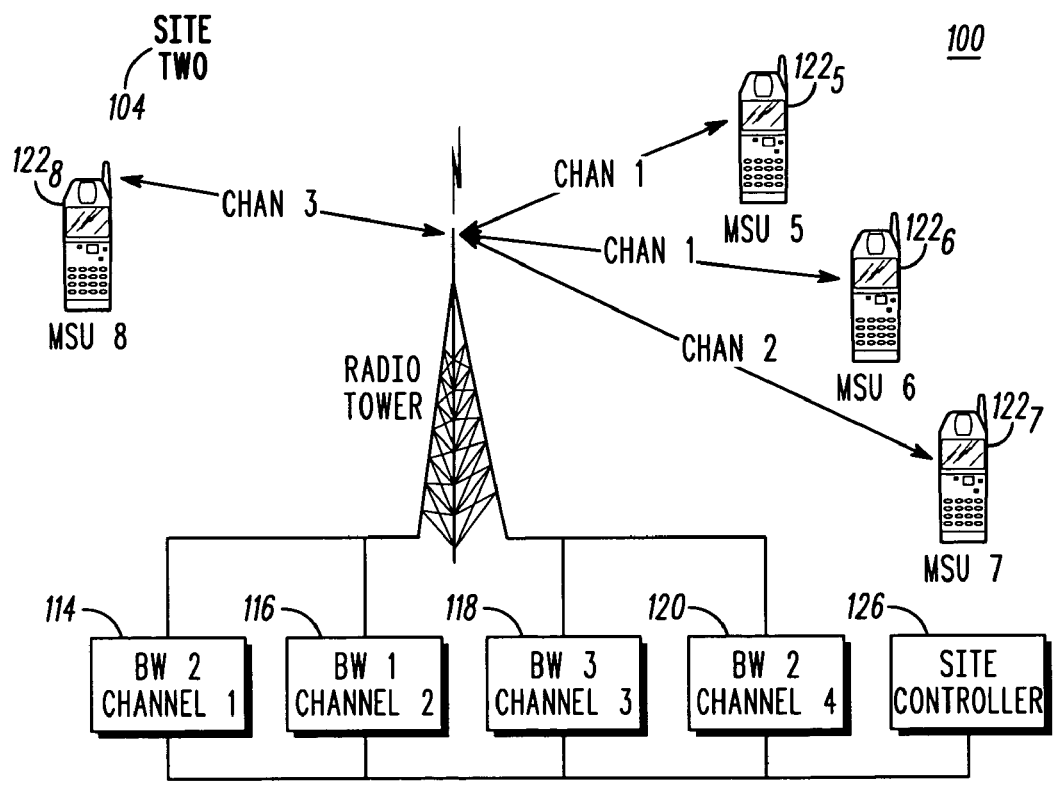

METHOD FOR EFFICIENT BANDWIDTH UTILIZATION IN A WIRELESS RADIO NETWORK

REFERENCE TO RELATED APPLICATION

The present application is related to the following U.S. application: Ser. No. 10/315,902, filed Dec. 10, 2002, titled "Method for Allocating Channel Resources in a Distributed Control Channel System" by Stogner et al., which is commonly owned together with this application by Motorola, Inc.

FIELD OF THE INVENTION

The present invention relates generally to a method for efficient bandwidth utilization in a wireless radio network.

BACKGROUND OF THE INVENTION

A wireless radio network may consist of many mobile subscriber units ("MSUs") all competing for bandwidth resources that are offered in their service area. In addition, fixed network equipment ("FNE") that serves the MSUs may offer different levels of service in the form of channels of differing bandwidth capabilities. Due to the different levels of service, radio resource management is necessary.

Several techniques have been used to perform radio resource management. One is for the FNE to advertise to the MSUs information about each channel. The MSUs can then choose to move to a new channel if the channel that they are using is no longer satisfactory due to the signal quality or channel loading. This technique may be referred to as "autonomous movement" because the MSUs move to a new channel without informing the FNE prior to registration.

There are several disadvantages with the autonomous movement technique. One disadvantage is that the MSUs move without the knowledge of what the other MSUs are doing, so it is possible for many MSUs to move all at once; if they all make their decision to move based on the same advertised data, they could all move to the same channel, causing that channel to become overloaded. Another disadvantage to the autonomous movement technique is that the MSUs move based on advertised data, which may be out of date when they decide to move. Yet another disadvantage to the autonomous movement technique is that the MSUs move without first informing the FNE, so there is a short period of time when the FNE has outdated information about what channel the particular MSU is on. Yet still another disadvantage to the autonomous movement technique is that the amount of data that must be advertised for an MSU to make a "good" decision to move to another channel can be excessive, thus using up too much of the available bandwidth.

Another technique to perform radio resource management is that the FNE always controls what channel the MSU is on. If a MSU wants to use a channel, it requests a channel from the FNE. The MSU may request a channel before every transmission, or only when it is unable to transfer data on the current channel. In addition, the FNE may attempt to move the MSUs in order to keep an even load on the channels.

There are also several disadvantages to this technique. One disadvantage is that the FNE does not know the signal quality of each bandwidth group, or each individual channel, so it may move the MSU to a channel having a poor signal quality. Another disadvantage is that the FNE does not know when a MSU is going to need bandwidth resources, so it may move a MSU unnecessarily. Yet another disadvantage is that overhead signaling is required, which can slow down access to the network by the MSU.

Moreover, the autonomous movement technique and the radio resource management technique require certain signal quality measurements to be made by the MSUs on a plurality of channels. An issue with these measurements is that they can be intrusive to the normal operation of the MSU.

Thus, there exists a need for efficiently assigning the MSUs to channels such that the bandwidth resources of the FNE are used effectively, and a need for effective channel quality measurements so that they are not as intrusive to the normal operation of the MSU.

BRIEF DESCRIPTION OF THE FIGURE

A preferred embodiment of the invention is now described, by way of example only, with reference to the accompanying FIGURE in which a top-level block diagram of an example wireless radio network in accordance with the present invention.

DETAILED DESCRIPTION OF THE PREFERRED EMBODIMENT

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention provides resource management for roaming mobile subscriber units ("MSUs") in a system comprising data channels having different throughput capabilities. The present invention prevents a plurality (i.e., two or more) MSUs from moving simultaneously to the same channel; further, the present invention prevents MSUs from being moved between channels unnecessarily (i.e., a MSU will not be moved if it does not currently need bandwidth resources). Thus, the following discussion addresses what data is transmitted between the FNE to the MSUs (i.e., the advertised data), how the MSUs use the advertised data, and how the FNE efficiently assigns bandwidth resources to the MSUs. Let us now discuss the present invention in detail.

As illustrated in the FIGURE, an example of a wireless radio network 100 is shown. In this example, there are two adjacent sites 102, 104, and each site has four channels 106-120, four MSUs $122_n$, and a FNE 124, 126. Each channel box 106-120 is responsible for managing radio hardware and managing access to the radio channel. The FNE 124, 126 is responsible for overall control and management of its respective site 102, 104. For purposes of this example, three channels 106, 108, 116 are configured as 25 kHz channels (BW1), four channels 110, 112, 114, 120 are configured as 50 kHz channels (BW2) and one channel 118 is configured as a 100 kHz channel (BW3). All channels of a common bandwidth are classified together and referred to as a bandwidth group, typically with one channel representing the entire bandwidth group. In Site One 102, three MSUs $122_1$, $122_2$, $122_3$ are assigned to channel 1 106, and one MSU $122_4$ is assigned to channel 3 110. In Site Two 104, two MSUs $122_5$, $122_6$ are assigned to channel 1 114, one MSU $122_7$ is assigned to channel 2 116, and one MSU $122_8$ is assigned to channel 3 118. It should be noted that a different number of channels and/or bandwidth configurations can be used and still remain within the spirit and scope of the present invention.

In normal operation, each FNE 124 (126) broadcasts the following data (also referred to as the advertised data) on all the channels 106-120 at the serving site 102, 104: an adjacent site status message and an additional carrier broadcast message. The FNE 124 (126) transmits the adjacent site status message for each adjacent site. For example, in the FIGURE, the FNE 124 at Site One 102 would broadcast information about Site Two 104; the FNE 124 at Site One 102 obtains this information from the infrastructure. The adjacent site status message contains data for an adjacent site that is used by a MSU 122$_n$ when it must roam to the adjacent site. Typically, each adjacent site status message comprises information identifying at least one channel from the lowest bandwidth group for the site; this channel is typically referred to as the "main" channel for the site. It should be noted that the lowest bandwidth group represents the narrowest channel bandwidth and/or best radio frequency coverage. Further, the adjacent site status message comprises information for each bandwidth group in the adjacent site. For example, the information that is broadcasted in the adjacent site status message may comprise, but is not limited to, loading information and/or channel frequency information.

Since the channels are grouped into bandwidth groups, the FNE 124 (126) does not have to broadcast data for all of the channels, but rather only the representative channel for each bandwidth group. Thus, using bandwidth groups reduces the amount of data that must be broadcast; rather than broadcasting data for each channel, the channels are grouped by a common bandwidth, and data is sent for each group. The entire group of channels in a given bandwidth group has the same roaming characteristics (e.g., signal strength, bandwidth, or the like).

The FNE 124 (126) also transmits the additional carrier broadcast message. The additional carrier broadcast message comprises information relating to at least one channel for each bandwidth group of the serving site. Typically, the information includes loading information and/or channel frequency information. The FNE 124 (126) determines loading on the channel in the site using a variety of well-known techniques; for example, the FNE 124 (126) may count the number of users on a channel, calculate the number of bits per second that are being used over a period of time, calculate the amount of bandwidth currently being used (current bandwidth utilization), calculate the amount bandwidth reserved for future use (future bandwidth reservations), or the like.

It should be noted that the FNE 124 (126) might combine the adjacent site status message for each adjacent site into a single message prior to broadcasting to the MSUs. Further, the FNE 124 (126) may combine the adjacent site status message(s) with the additional carrier broadcast message in a single message. It should be obvious to those skilled in the art that the number of messages used by the FNE to communicate the advertised data to the MSUs 122$_n$ does not limit the present invention.

When a MSU 122$_n$ first powers up, the MSU 122$_n$ scans its environment and locks onto a channel in its desired bandwidth group. The MSU 122$_n$ then registers with the system 100, informing the FNE 124 (126) of its identity and presence at the site 102 (104). The FNE 124 (126) acknowledges the MSU's registration and transmits a message to the MSU 122$_n$ informing the MSU 122$_n$ of the channel to which it should move (typically the least loaded channel in the desired bandwidth group). Alternatively, as opposed to locking onto a channel in its desired bandwidth group, the MSU 122$_n$ may transmit its desired bandwidth group to the FNE upon registration. If a channel in the desired bandwidth group is not available, the FNE instructs the MSU 122$_n$ to move to a channel in a lower bandwidth group, preferably in descending order, if available. If a lower bandwidth channel is not available, the FNE instructs the MSU 122$_n$ to move to a channel in the desired bandwidth group and overload the channel.

As noted above, the FNE 124 (126) broadcasts the advertised data for the serving site and the adjacent site(s) so that the MSUs can periodically sample the channels for signal quality measurements. The MSUs 122$_n$ then can compare the signal quality measurements of other channel against the current channel (as described below) and make the roaming decision. The MSU 122$_n$ may choose to intrasite roam (i.e., roam to a new channel on the same site) or intersite roam (i.e., roam to a new channel on a different site). Let us first discuss intrasite roaming.

The MSU 122$_n$ may choose to intrasite roam for a variety of reasons, including, but not limited to: channel failure, change in the required quality of service for an application, poor signal quality, and current channel overload. In the preferred embodiment, the MSU 122$_n$ prefers intrasite roaming over intersite roaming because the MSU 122$_n$ has more information about its current site 102 (104) than its adjacent sites 104 (102), from the additional carrier broadcast message, which comprises a representative channel for each bandwidth group in the site.

In the case of intrasite roaming due to channel failure, if the channel that the MSU 122$_n$ is currently on fails, then the MSU 122$_n$ finds a new channel in the site based on information broadcasted from the FNE 124 (126) and signal strength measurements that the MSU 122$_n$ has performed. The broadcasted information includes, but is not limited to, available channels at adjacent sites, and available channel at its current site. The criteria used by the MSU 122$_n$ to determine whether it will roam to a new channel bandwidth group via autonomous roaming are as follows. Based on the broadcasted information, the MSU 122$_n$ samples the signal strength of those channels to determine availability to the particular MSU 122$_n$. It is important to note that since the channels belonging to a common bandwidth group will probably have the same signal quality, the MSU 122$_n$ does not have to sample (measure) the signal quality of all the channels within the bandwidth group, but rather sample the signal quality of only the representative channel for each bandwidth group; thus, the bandwidth groups reduces the amount of sampling to be performed by the MSU 122$_n$. This sampling may be performed randomly, at fixed intervals, upon detection of the signal quality on the current channel falling below a predetermined threshold, upon total loss of the signal on the current channel, or the like. Since the sampling can be intrusive if done too frequently, an alternative is to reduce the sampling frequency when the signal quality is above a certain threshold, or the signal quality gradient is below a certain threshold. Channel estimation techniques can be used to further reduce the frequency of sampling (e.g., the channel groups of different bandwidths at a site may have constant offsets for signal quality). The MSUs 122$_n$ than can sample only one channel bandwidth group (e.g., the current bandwidth group) and estimate the other bandwidth groups by adding or subtracting a constant offset.

Once the MSU 122$_n$ is on the new channel, the MSU 122$_n$ locks onto the new channel (e.g., by establishing a media access control ("MAC") session on the new channel). After the MSU 122$_n$ locks onto the new channel, the FNE 124 (126) determines whether the MSU 122$_n$ may remain on the selected channel or whether the MSU 122$_n$ should be instructed to move to a new channel in the last known requested bandwidth group preferably based on loading conditions; in other words, once the MSU 122$_n$ switches onto the new channel bandwidth group, the FNE-controlled roaming is used to instruct the MSU 122$_n$ to switch to other channels within the group (as part of load balancing), if necessary, to ensure even loading within the channels bandwidth groups.

In the case of intrasite roaming due to a change in the required quality of service for an application, the MSU $122_n$ may request a new bandwidth group or a specific channel without re-registering at the site. If the MSU $122_n$ specifies a specific bandwidth group, the FNE 124 (126) instructs the MSU $122_n$ which channel to move to, if available (preferably the least loaded channel in the specific bandwidth group); if the MSU $122_n$ specifies a specific channel, the FNE 124 (126) either grants or denies the request. For example, if a police officer is performing a license plate check application (application 1), the MSU $122_n$ in which he is operating is assigned to a channel within a first bandwidth group. Upon initiation of a web browser application, (application 2), the MSU $122_n$ the officer is using requests to move to a new channel within a second bandwidth group, wherein the new channel within the second bandwidth group has a higher throughput capability than that of the channel assigned to the MSU $122_n$ within the first bandwidth group.

In the case of intrasite roaming due to poor signal quality, the MSU $122_n$ moves to a new channel bandwidth group within the same site. The MSU $122_n$ determines which channel to move to based on the roaming criteria described above in the channel failure case. Once the MSU $122_n$ is on the new channel, the MSU $122_n$ locks onto the new channel. After the MSU locks onto the new channel, the FNE 124 (126) determines whether the MSU $122_n$ may remain on the selected channel or whether the MSU $122_n$ should be instructed to move to a new channel in the last known requested bandwidth group preferably based on loading conditions. If the MSU $122_n$ is unsuccessful in moving to a new channel within the same site, however, the MSU $122_n$ resorts to intersite roaming (i.e., moving to a new channel in a different site), as described below.

In the preferred embodiment of the present invention, the MSU $122_n$ roams as a result of poor channel signal quality by using an autonomous method which reduces the amount of signaling that has to be sent by the MSU $122_n$ to update the FNE 124 (126) signal quality database. The autonomous method also ensures that the channel signal quality data is up-to-date because the movement decision is made by the MSU $122_n$, and that is where the data resides.

In the case of intrasite roaming due to the current channel becoming overloaded, the MSU $122_n$ is unable to transmit data on its current channel due to the channel being overloaded (i.e., the MSU $122_n$ attempts to transmit data is denied). Upon detection that the MSU $122_n$ is unable to transmit data on its current channel, the FNE 124 (126) instructs the MSU $122_n$ to move to a new channel, if available (preferably the least loaded channel in its current bandwidth group). As such, in the event of an overloaded channel, the FNE 124 (126) only instructs MSUs $122_n$ to move to a new channel when the MSU $122_n$ has pending data to transmit.

It should be noted that when the MSU $122_n$ roams due to the channel becoming overloaded is done by using the FNE 124 (126) directed method to prevent multiple MSUs $122_n$ from migrating all at once to a channel with a low advertised loading. Moreover, the FNE 124 (126) directed roaming when a channel becomes overloaded also ensures that the loading data is current because the roaming decision is made by the FNE and that is where the loading data resides. The FNE 124 (126) directed roaming reduces the amount of data that has to be broadcast to the MSU $122_n$. Further, the FNE 124 (126) can anticipate to which channel the MSU $122_n$ will move, and thus can more accurately estimate channel loading. At this point, different scenarios have been described when the MSU roams to a new channel within the same site. It is important to note that when intrasite roaming, the MSU does not have to re-register at the site. Now let us discuss intersite roaming. When the MSU $122_n$ roams (i.e., makes a controlled move) to a new channel on a different site (intersite roaming), typically based on information advertised in the adjacent site status message, the MSU $122_n$ locks onto the "main" channel on the new site (which was advertised in the adjacent site status message) and performs a registration/location update with the FNE 126 (124) at the new site 104 (102); the registration/location update informs the FNE 126 (124) at the new site 104 (102) of its identity and presence at the site and comprises the desired bandwidth group. Receipt of the registration/location update triggers the FNE 126 (124) at the new site 104 (102) to instruct the MSU $122_n$ to move to a channel, preferably within the desired bandwidth group, based on loading at the new site 104 (102). The FNE 104 (102) at the new site 104 (102) informs the FNE 124 (126) at the previous site 102 (104) that the MSU $122_n$ is no longer at its site, and the FNE 124 (126) at the previous site 102 (104) updates its database/calculations accordingly.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a network comprising a plurality of channels, wherein at least two channels are operating at different frequencies, a method comprising the steps of:
   at a fixed network equipment,
   identifying a plurality of channels having different bandwidths present at a serving site;
   classifying each channel into one of a plurality of bandwidth groups, wherein all the channels in a given bandwidth group have at least a common bandwidth;
   broadcasting information relating to at least one channel in each bandwidth group present at the serving site;
   identifying at least one channel present at an adjacent site;
   classifying each channel present at the adjacent site into one of the plurality of bandwidth groups;
   broadcasting information relating to at least one channel in each bandwidth group present at the adjacent site; and
   broadcasting information relating to at least one channel from a lowest bandwidth group for the adjacent site.

2. The method of claim 1 wherein the information that is broadcasted relating to at least one channel in each bandwidth group present at the adjacent site comprises at least one of loading information and channel frequency information.

3. The method of claim 1 wherein the information that is broadcasted relating to at least one channel in each bandwidth group present at the serving site comprises at least one of loading information and channel frequency information.

4. In a network comprising a plurality of channels, wherein at least two channels are operating at different frequencies, a method comprising the steps of:
   at a fixed network equipment,
   identifying a plurality of channels having different bandwidths present at a sewing site;
   classifying each channel into one of a plurality of bandwidth groups, wherein all the channels in a given bandwidth group have at least a common bandwidth;

broadcasting information relating to at least one channel in each bandwidth group present at the serving site;

receiving a desired bandwidth group request via a registration request from a device at the serving site;

determining a desired bandwidth group for the device;

instructing the device to move to a channel based on the step of determining;

determining that the device moved to a second channel at the serving site; and determining that a re-registration request is not required for the device.

5. The method of claim 4 further comprising the step of moving the device to a new channel within the desired bandwidth group when data is waiting to be transferred between the device and fixed network equipment.

6. The method of claim 4 wherein the step of instructing is further based on loading of the channels in the desired bandwidth group.

7. The method of claim 6 wherein the loading is based on at least one of: current bandwidth utilization, bandwidth reservations, a number of devices operating on the channel.

8. The method of claim 4 wherein the step of determining the desired bandwidth group comprises identifying a channel in which the device locked onto at the time in which the registration request was received.

9. The method of claim 4 wherein the desired bandwidth group is requested in the registration request.

10. The method of claim 4 further comprising the step of instructing the device to move to a third channel based on the desired bandwidth group.

11. In a network comprising a plurality of channels, wherein at least two channels are operating at different frequencies, a method comprising the steps of:

at a fixed network equipment, identifying a plurality of channels having different bandwidths present at a serving site;

classifying each channel into one of a plurality of bandwidth groups, wherein all the channels in a given bandwidth group have at least a common bandwidth;

broadcasting information relating to at least one channel in each bandwidth group present at the serving site;

receiving a desired bandwidth group request via a registration request from a device at the serving site;

determining a desired bandwidth group for the device;

instructing the device to move to a channel based on the step of determining;

receiving a request from the device to move to a new bandwidth group at the serving site;

determining that a re-registration is not required from the device; and instructing the device to move to a new channel within the new bandwidth group.

12. The method of claim 11 further comprising the step of moving the device to a new channel within the desired bandwidth group when data is waiting to be transferred between the device and fixed network equipment.

13. The method of claim 11 wherein the step of instructing is further based on loading of the channels in the desired bandwidth group.

14. The method of claim 13 wherein the loading is based on at least one of: current bandwidth utilization, bandwidth reservations, a number of devices operating on the channel.

15. The method of claim 11 wherein the step of determining the desired bandwidth group comprises identifying a channel in which the device locked onto at the time in which the registration request was received.

16. The method of claim 11 wherein the desired bandwidth group is requested in the registration request.

* * * * *

UNITED STATES PATENT AND TRADEMARK OFFICE
CERTIFICATE OF CORRECTION

PATENT NO. : 7,558,235 B2  Page 1 of 1
APPLICATION NO. : 10/704296
DATED : July 7, 2009
INVENTOR(S) : Lester et al.

It is certified that error appears in the above-identified patent and that said Letters Patent is hereby corrected as shown below:

IN THE CLAIMS

In Column 6, Line 64, in Claim 4, delete "sewing" and insert -- serving --, therefor.

Signed and Sealed this
Eleventh Day of September, 2012

David J. Kappos
*Director of the United States Patent and Trademark Office*